May 18, 1926.
A. S. RAMAGE
1,585,602
OXYGEN COMPOUND OF TERPENE AND PROCESS OF MAKING SAME
Filed April 6, 1923
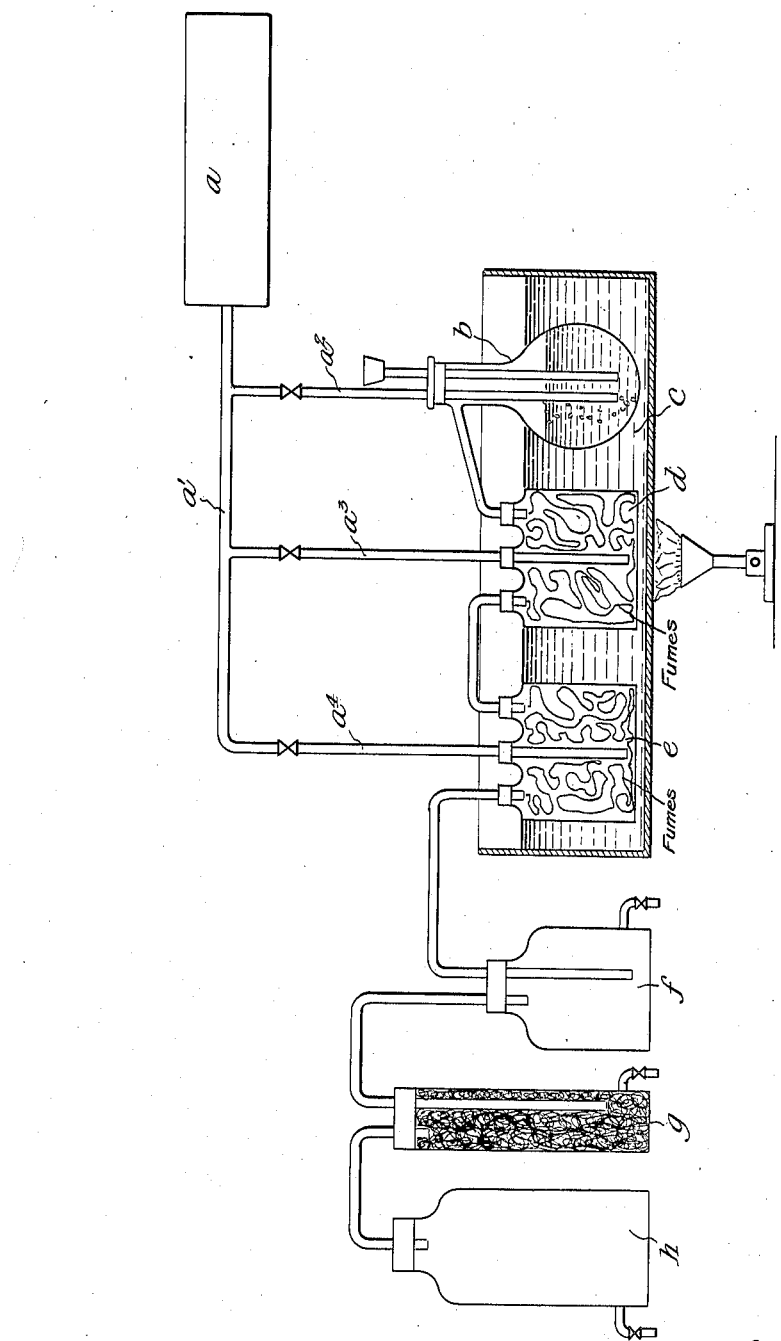
Inventor:
Alexander S. Ramage,
By Byrnes, Townsend & Brickenstein,
Attorneys.

Patented May 18, 1926.

1,585,602

UNITED STATES PATENT OFFICE.

ALEXANDER S. RAMAGE, OF DETROIT, MICHIGAN, ASSIGNOR TO THE OZONID CORPORATION, OF DETROIT, MICHIGAN, A CORPORATION OF MICHIGAN.

OXYGEN COMPOUND OF TERPENE AND PROCESS OF MAKING SAME.

Application filed April 6, 1923. Serial No. 630,398.

In my prior U. S. Patent No. 710,893, I described and claimed a new chemical compound, terpene peroxid, having the approximate formula $C_{10}H_{18}O_2$, insoluble in but decomposing in the presence of water into terpene and hydrogen peroxid. As therein described, this compound was prepared by bubbling ozone or ozonized air through a body of terpene hydrocarbon, such as oil of eucalyptus or cineol, at superatmospheric temperature, preferably about 60° C. Thereby white fumes of the peroxid were evolved, and condensed in a separate vessel by cooling to about 0° C. The condensed liquid product was the chemical product above mentioned. The process above described is broadly claimed in my prior Patent 1,098,356, patented May 26, 1914.

In other patents I have described certain modifications of the above described procedure. According to Patent 1,097,939 a more rapid and complete conversion was effected by vaporizing the hydrocarbon, and bringing the vapors into contact with ozone in presence of a catalytic agent such as platinized asbestos. According to Patent 1,097,940 cineol was subjected at atmospheric temperatures and in presence of platinized asbestos to the continued action of ozone for several hours and until it was converted into a viscous, non-volatile syrupy liquid having a powerful germicidal action, and decomposing explosively if subjected to heat.

I have now discovered that by the continued action of ozone upon the vapors of unstable oxygen compounds of terpene containing not more than two atoms of oxygen to the molecule, such as those of terpene peroxid produced by treating eucalyptol or oil of eucalyptus containing a high percentage of eucalyptol with ozone or with ozonized air, such vapors may be further oxidized, yielding a novel compound of much higher oxygen content and having the approximate formula $C_{10}H_{18}O_4$. By the term unstable oxygen compound of terpene, I designate such oxygen compounds as undergo decomposition in the presence of moisture, as already mentioned. This product, which it will be noted has approximately twice the oxygen content of the compound which I have heretofore designated "terpene peroxid" or "camphoric peroxid", upon contact with moisture liberates nascent or active oxygen for a period of 36 to 48 hours.

The accompanying drawing illustrates diagrammatically, as an example, a convenient arrangement of apparatus for carrying out my invention.

In said drawing $a$ indicates an ozonizer of any approved type provided at its outlet end with a manifold $a'$ carrying a plurality of valved pipes, indicated as three in number. The first of these $a^2$ leads beneath the surface of a body of oil of eucalyptus contained in a reactor $b$, which may be of glass. This is heated, for example by means of a water bath $c$, to a temperature which is sufficient to induce the formation and maintenance of the fume, the preferred temperature being about 80° C. The white fumes pass over into one or more Woulffe bottles, indicated at $d$ and $e$, and are further subjected therein to ozone introduced through the manifold inlets $a^3$ and $a^4$.

To insure the highest degree of oxidation it is necessary that in the first and second Woulffe bottles in which the fumes of terpene peroxid intially formed are exposed to fresh ozone, the ozone should ultimately be present in excess.

From the Woulffe bottles the oxidized fumes pass to any suitable collecting system, illustrated as comprising a collecting vessel $f$, a scrubber or scrubbers $g$ containing absorbent cotton or equivalent material, and and a final condenser $h$. When ozonized air is used as the oxidizing agent the effluent vapors contain a high proportion of inert gases, and an efficient collecting system is necessary to insure good recoveries of the product.

The product prepared as above described is a colorless mobile liquid having a low freezing point, remaining liquid at temperatures decidedly below 0° F. It cannot be distilled without partial decomposition with liberation of large quantities of oxygen.

I claim:

1. The hereindescribed process of making an oxygen compound of terpene containing more than two atoms of oxygen, comprising reacting with ozone upon an unstable oxygen compound of terpene containing not more than two atoms of oxygen, in vapor phase.

2. The hereindescribed process of making an oxygen compound of terpene containing more than two atoms of oxygen, comprising subjecting an unstable oxygen compound of terpene containing not more than two atoms of oxygen in vapor phase to repeated contacts with ozone.

3. Process according to claim 1 wherein the ozone is contacted with the unstable oxygen compound of terpene containing not more than two atoms of oxygen at a temperature approximating 80° C.

4. Process according to claim 2 wherein the ozone is contacted with the unstable oxygen compound of terpene containing not more than two atoms of oxygen at a temperature approximating 80° C.

5. The hereindescribed oxygen compound of terpene corresponding approximately to the formula $C_{10}H_{18}O_4$ and undergoing slow decomposition in presence of moisture with liberation of oxygen.

In testimony whereof, I affix my signature.

ALEXANDER S. RAMAGE.